United States Patent
Veloso et al.

(10) Patent No.: US 10,322,695 B1
(45) Date of Patent: Jun. 18, 2019

(54) SYSTEM AND METHOD TO DETECT VEHICLE MOVEMENT

(71) Applicant: GM GLOBAL TECHNOLOGY OPERATIONS LLC, Detroit, MI (US)

(72) Inventors: Alex J. Veloso, Rochester Hills, MI (US); Scott T. Droste, West Bloomfield, MI (US); George Knish, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/008,755

(22) Filed: Jun. 14, 2018

(51) Int. Cl.
*B60R 25/10* (2013.01)
*B60R 25/33* (2013.01)
*B60R 25/102* (2013.01)

(52) U.S. Cl.
CPC .......... *B60R 25/102* (2013.01); *B60R 25/33* (2013.01); *B60R 2025/1016* (2013.01); *B60R 2325/205* (2013.01); *B60R 2325/207* (2013.01)

(58) Field of Classification Search
CPC ............................. B60K 28/06; A60W 40/08

USPC .......................................................... 340/576
See application file for complete search history.

(56) References Cited

U.S. PATENT DOCUMENTS

| 2014/0231166 A1* | 8/2014 | Miller | B60W 40/08 180/272 |
| 2015/0216466 A1* | 8/2015 | Kronberg | A61B 5/18 702/19 |
| 2017/0131261 A1* | 5/2017 | Biondo | G01N 33/4972 |

\* cited by examiner

*Primary Examiner* — Fabricio R Murillo Garcia (57) ABSTRACT

One general aspect includes a method of detecting vehicle movement, the method including: (a) measuring, via a controller, one or more signal variables as a first variable data set; (b) at some duration of time after the first variable data set is measured, via the controller, measuring the one or more signal variables as a second variable data set; (c) comparing, via the controller, the first and second variable data sets; (d) determining, via the controller, if substantial differences exist between the first and second variable data sets; (e) when it is determined that substantial differences exist between the first and second variable data sets, via the controller, generating a notification configured to indicate vehicle movement has been detected.

18 Claims, 2 Drawing Sheets

16: land communications network
20: data center
28: vehicle electronics
30: telematics unit
36: audio system
40: vehicle navigation module
42: vehicle system modules
50: cellular chipset
52: electronic processing device
54: digital memory device
80: switch
84: databases
88: automated voice response system (VRS)

SYSTEM AND METHOD TO DETECT VEHICLE MOVEMENT

INTRODUCTION

Detection of vehicle movement can be helpful to implement when a vehicle is either towed without customer awareness or stolen by being unlawfully towed from its original parking location. For instance, sensors may be installed throughout a vehicle to detect vehicle displacement after the vehicle has been turned off. However, these sensors can be expensive, difficult to properly calibrate, and/or consume an excessive amount of power that can drain the vehicle's battery. Alternatively, implementing routine activation of the vehicle's GNSS module after the vehicle is off also consumes excessive amounts of energy that can drain the battery. However, an inexpensive and simple way of detecting vehicle movement is to activate the vehicle's telematics unit to check for changes in cellular network frequencies and identifiers. It is therefore desirable to detect vehicle movement in this inexpensive and simple manner which does not additionally drain the vehicle's battery.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of detecting vehicle movement, the method including: (a) measuring, via a controller, one or more signal variables as a first variable data set; (b) at some duration of time after the first variable data set is measured, via the controller, measuring the one or more signal variables as a second variable data set; (c) comparing, via the controller, the first and second variable data sets; (d) determining, via the controller, if substantial differences exist between the first and second variable data sets; and (e) when it is determined that substantial differences exist between the first and second variable data sets, via the controller, generating a notification configured to indicate vehicle movement has been detected. Other embodiments of this aspect include corresponding computer systems, apparatus, and computer programs recorded on one or more computer storage devices, each configured to perform the actions of the methods.

Implementations may include one or more of the following features. The method further including (f) sending, via the controller, the notification to a mobile computing device. The method where the notification is sent to the mobile computing device for the purpose of indicating an occurrence of vehicle theft or tow away. The method further including: (f) sending, via the controller, the notification to a data center. The method may also include (g) formatting, via the data center, the notification to be exhibitable on a user interface of a mobile computing device for the purpose of indicating an occurrence of vehicle theft or tow away. The method may also include (h) sending, via the data center, the notification to the mobile computing device. The method where the controller is located in a telematics unit of a vehicle and each step of the method occurs after the vehicle has been turned to an ignition OFF state. The method further including: (i) generating, via the data center, a vehicle inhibition command to cause the vehicle to remain in the ignition OFF state when the notification has been received; and (j) sending, via the data center, the vehicle inhibition command to the vehicle. The method further including: prior to step (b), (f) measuring, via the controller, GNSS location data from a GNSS module as first GNSS location coordinates; (g) after it is determined that substantial differences exist between the first and second variable data sets, via the controller, measuring the GNSS location data from the GNSS module as second GNSS location coordinates; (h) comparing, via the controller, the first and second GNSS location coordinates; (i) determining, via the controller, if substantial differences exist between the first and second GNSS location coordinates; and where step (e) is further defined as generating, via the controller, a notification configured to indicate vehicle movement has been detected when it is determined that both (1) substantial differences exist between the first and second variable data sets and (2) substantial differences exist between the first and second GNSS location coordinates. The method where the signal variables including an RSRQ, RSRP, cell identifier, and cell frequency identified from a serving cell tower as well as an RSRQ, RSRP, cell identifier, and cell frequency identified from one or more neighboring cell towers. The method where the signal variables are received from a plurality of cell towers of a wireless carrier system. Implementations of the described techniques may include hardware, a method or process, or computer software on a computer-accessible medium.

One general aspect includes a system of detecting vehicle movement, the system including: a memory configured to include one or more executable instructions and a controller configured to execute the executable instructions, where the executable instructions enable the controller to: (a) measure one or more signal variables as a first variable data set; (b) at some duration of time after the first variable data set is measured, measure the one or more signal variables as a second variable data set; (c) compare the first and second variable data sets; (d) determine if substantial differences exist between the first and second variable data sets; and (e) when it is determined that substantial differences exist between the first and second variable data sets, generate a notification configured to indicate vehicle movement has been detected. Other embodiments of this aspect include corresponding computer systems, apparatus, and computer programs recorded on one or more computer storage devices, each configured to perform the actions of the methods.

Implementations may include one or more of the following features. The system where the executable instructions further enable the controller to: (f) send the notification to a mobile computing device. The system where the notification is sent to the mobile computing device for the purpose of indicating an occurrence of vehicle theft. The system further including: a data center located remotely from the controller; where the executable instructions further enable the controller to: (f) send the notification to the data center; where, after being received, the data center formats the notification to be exhibitable on a user interface of a mobile computing device for the purpose of indicating an occurrence of vehicle theft and the data center subsequently sends the notification to the mobile computing device. The system where the controller is located in a telematics unit of a vehicle and the controller executes the executable instructions after the vehicle has been turned to an ignition OFF state. The system where: the data center will generate a vehicle inhibition command to cause the vehicle to remain in the ignition OFF state when the notification has been received and the data center will send the vehicle inhibition command to the vehicle. The system where the executable instructions further enable the controller to: prior to step (b), (f) measure GNSS location data from a GNSS module as first GNSS location coordinates; (g) after it is determined that substantial differences exist between the first and second variable data sets, measure the GNSS location data from the GNSS module as second GNSS location coordinates; (h) compare the first and second GNSS location coordinates; (i) determine if substantial differences exist between the first and second GNSS location coordinates; and where step (e) is further defined as generate a notification configured to indicate vehicle movement has been detected when it is determined that both (1) substantial differences exist between the first and second variable data sets and (2) substantial differences exist between the first and second GNSS location coordinates. The system where the signal variables including an RSRQ, RSRP, cell identifier, and cell frequency identified from a serving cell tower as well as an RSRQ, RSRP, cell identifier, and cell frequency identified from one or more neighboring cell towers. The system where the signal variables are received from a plurality of cell towers of a wireless carrier system. Implementations of the described techniques may include hardware, a method or process, or computer software on a computer-accessible medium.

One general aspect includes a non-transitory and machine-readable medium having stored thereon executable instructions adapted to detect vehicle movement, which when provided to a controller and executed thereby, causes the controller to: (a) measure one or more signal variables as a first variable data set; (b) at some duration of time after the first variable data set is measured, measure the one or more signal variables as a second variable data set; (c) compare the first and second variable data sets; (d) determine if substantial differences exist between the first and second variable data sets; and (e) when it is determined that substantial differences exist between the first and second variable data sets, generate a notification configured to indicate vehicle movement has been detected. Other embodiments of this aspect include corresponding computer systems, apparatus, and computer programs recorded on one or more computer storage devices, each configured to perform the actions of the methods.

Implementations may include one or more of the following features. The non-transitory and machine-readable memory further including: (f) send the notification to a mobile computing device. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
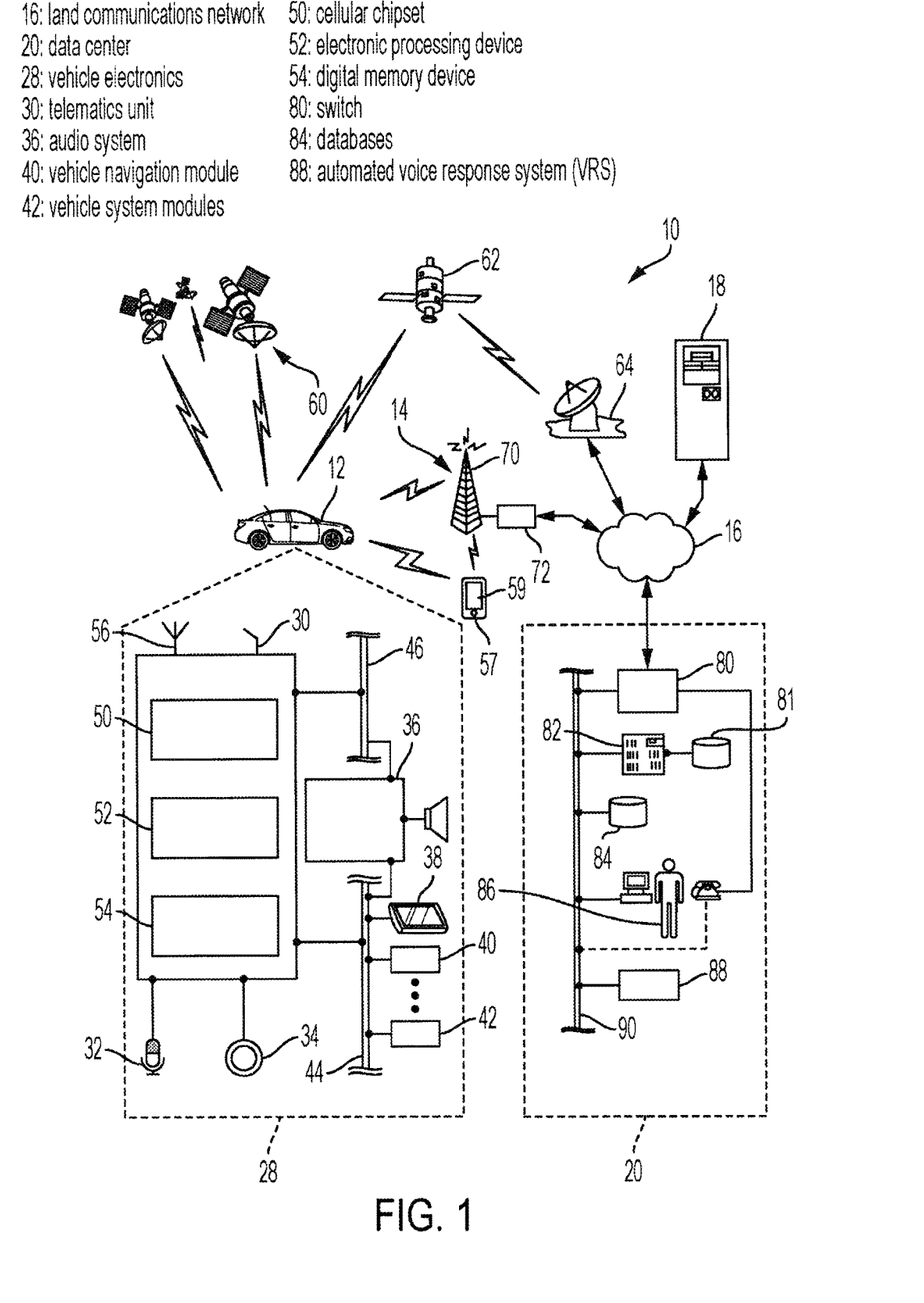
FIG. 1 is a block diagram depicting an exemplary embodiment of a communications system that is capable of utilizing the system and method disclosed herein.

With reference to FIG. 1, there is shown an operating environment that includes, among other features, a mobile vehicle communications system 10 and that can be used to implement the method disclosed herein. Communications system 10 generally includes a vehicle 12, one or more wireless carrier systems 14, a land communications network 16, a computer 18, and a data center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including, but not limited to, motorcycles, trucks, busses, sports utility vehicles (SUVs), recreational vehicles (RVs), construction vehicles (e.g., bulldozers), trains, trolleys, marine vessels (e.g., boats), aircraft, helicopters, amusement park vehicles, farm equipment, golf carts, trams, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GNSS module 40 as well as a number of vehicle system modules (VSMs) 42. Some of these devices can be connected directly to the telematics unit 30 such as, for example, the microphone 32 and pushbutton(s) 34, whereas others are indirectly connected using one or more network connections, such as a communications bus 44 or an entertainment bus 46. Examples of suitable network connections include a controller area network (CAN), WIFI, Bluetooth and Bluetooth Low Energy, a media-oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket transceiver device that is installed in the vehicle and that enables wireless voice and/or data communication over wireless carrier system 14 and via wireless networking. This enables the vehicle to communicate with data center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation (e.g., determining vehicle location based on certain cellular signal variables—discussed below), telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor 86 or voice response unit at the data center 20) and data communication (e.g., to provide GNSS location data or vehicle diagnostic data to the data center 20), the system can utilize a single call over a voice channel and switch as needed between voice and data transmission over the voice channel, and this can be done using techniques known to those skilled in the art.

According to one embodiment, telematics unit 30 utilizes cellular communication according to standards such as 3G, 4G, 4G LTE, or 5G and thus includes a standard cellular chipset 50 for voice communications like hands-free calling, a wireless modem for data transmission (i.e., transceiver), an electronic processing device 52, at least one digital memory device 54, and an antenna system 56. It should be appreciated that the modem can either be implemented through software stored in the telematics unit and is executed by processor 52, or it can be a separate hardware component located internal or external to telematics unit 30. The modem can operate using any number of different standards or protocols such as, but not limited to, WCDMA, LTE, 3G, 4G, and 5G. Wireless networking between vehicle 12 and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

According to one embodiment, telematics unit 30 can correspond with antenna system 56 to utilize cellular communications to monitor signal variables (signal properties) in order to find a suitable cell tower 70 within wireless carrier system 14. For example, implementing antenna system 56, telematics unit 30 is able to identify intra-frequency cell tower signals and inter-frequency cell tower signals in order to perform measurements of the received signal received quality (RSRQ) and received signal received power (RSRP) of each tower. Moreover, the RSRQ and RSRP can be associated with the physical cell identifier broadcast and cell frequency of the specific cell tower 70 from which they were measured. (As such, per each cell tower 70, the cell identifier, cell frequency RSRQ, and RSRP will be monitored and measured by telematics unit 30.) Once numerous RSRQ and RSRP measurements have been made for multiple cell towers 70, telematics unit 30 will determine which cell tower 70 is the most suitable to connect with, for example, the cell tower 70 producing signals with the best determined RSRQ and RSRP measurements. Monitoring and measuring signal variables is a well known and standardized process. Moreover, the specifics of the wireless carrier system 14 and its requisite features are further discussed below.

Skilled artists will know the RSRP as a Received Signal Strength Indicator (RSSI) type of measurement, which is the power of the cell tower signals spread over the full bandwidth and narrowband. Skilled artists will know the RSRQ as the signal quality considering also RSSI and the number of used Resource Blocks (N) RSRQ=(N*RSRP)/RSSI measured over the same bandwidth. RSRQ is a C/I type of measurement and indicates the quality of the received reference signal. The RSRQ measurement can also provide additional information when RSRP is not sufficient to make a reliable handover or cell tower reselection decision. As is generally known, the cell identifier is the generally unique number used to identify each cell tower 70 and the cell frequency is the generally unique LTE channel number assigned to the cell tower 70.

In addition, from these signal variables, the telematics unit 30 can also determine vehicle position information for the purposes of providing vehicle position-related services such as, for example, the detection of vehicle displacement after the vehicle's engine has been turned to an OFF state (discussed below). For instance, once connected to a suitable cell tower 70, telematics unit 30 will measure the signal variables (e.g., RSRQ, RSRP, cell identifier, and cell frequency) at a first point in time. After a substantial amount of time has passed, telematics unit 30 will again measure the signal variables at a second point in time. Additionally, telematics unit 30 will compare the signal variables from the first and second points in time. If there are differences between any one of the signal variables beyond a certain threshold amount, the telematics unit 30 will see that the vehicle has been moved from its starting location to some other location. Monitoring differences in the cell signal variables can also be used to determine specific vehicle locations as an alternative to operating GNSS module 40.

Telematics Controller 52 (processor) can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Telematics Controller 52 executes various types of digitally-stored instructions, such as software or firmware programs stored in memory 54, which enable the telematics unit to provide a wide variety of services. For instance, controller 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GNSS-based vehicle navigation module 40; airbag deployment notification and other emergency or roadside assistance-related services provided in connection with one or more vehicle system modules 42 (VSM); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit 30 is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GNSS module 40 receives radio signals from a constellation 60 of GNSS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GNSS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to data center 20 or other remote computer system, such as computer 18, for other purposes, such as fleet management. Also, new or updated map data can be downloaded to the GNSS module 40 from the data center 20 via the telematics unit 30.

Apart from the audio system 36 and GNSS module 40, the vehicle 12 can include other VSMs 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests.

As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module (BCM) that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art.

The pushbutton(s) 34 allow manual user input into the telematics unit 30 to initiate wireless telephone calls and provide other data, response, or control input. Separate pushbuttons can be used for initiating emergency calls versus regular service assistance calls to the data center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM, media streaming services (e.g., PANDORA RADIO™, SPOTIFY™, etc.), satellite radio, CD, DVD, and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions (i.e., capable of GUI implementation). Audio system 36 may also generate at least one audio notification to announce such third-party contact information is being exhibited on display 38 and/or may generate an audio notification which independently announces the third-party contact information. Various other vehicle user interfaces can also be utilized, as the interfaces of FIG. 1 are only an example of one particular implementation.

One of the networked devices that can communicate with the telematics unit 30 is a mobile computing device 57, such as a smart phone, personal laptop computer, smart wearable device, or tablet computer having two-way communication capabilities, a netbook computer, or any suitable combinations thereof. The mobile computing device 57 can include computer processing capability, a transceiver capable of communicating with wireless carrier system 14, a user interface 59, and/or a GNSS module capable of receiving GNSS satellite signals and generating GNSS coordinates based on those signals. User interface 59 may be embodied as a touch-screen graphical interface capable of user interaction as well as displaying various forms of exhibitable information (e.g., GUIs, SMS text messages/notifications, etc.). Examples of the mobile computing device 57 include the iPhone™ manufactured by Apple, Inc. and the Pixel™ manufactured by HTC, Inc. as well as others. While the mobile computing device 57 may include the ability to communicate via cellular communications using the wireless carrier system 14, this is not always the case. For instance, Apple manufactures devices such as the various models of the iPad™ and iPod Touch™ that include the processing capability, interface 59, and the ability to communicate over a short-range wireless communication link such as, but not limited to, WIFI and Bluetooth. However, the iPod Touch™ and some iPads™ do not have cellular communication capabilities. Even so, these and other similar devices may be used or considered a type of wireless device, such as the mobile computing device 57, for the purposes of the method described herein.

Mobile device 57 may be used inside or outside of vehicle 12, and may be coupled to the vehicle by wire or wirelessly.

The mobile device also may be configured to provide services according to a subscription agreement with a third-party facility or wireless/telephone service provider. It should be appreciated that various service providers may utilize the wireless carrier system 14 and that the service provider of the telematics unit 30 may not necessarily be the same as the service provider of the mobile devices 57.

Wireless carrier system 14 is preferably a cellular telephone system that includes a plurality of the cell towers 70 (only one shown), one or more cellular network infrastructures (CNI) 72, as well as any other networking components required to connect wireless carrier system 14 with land network 16. Each cell tower 70 includes sending and receiving antennas and a base station, with the base stations from different cell towers being connected to the CNI 72 either directly or via intermediary equipment such as a base station controller. Cellular system 14 can implement any suitable communications technology, including for example, analog technologies such as AMPS, or the newer digital technologies such as 3G, 4G LTE, and 5G. As will be appreciated by skilled artisans, various cell tower/base station/CNI arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to data center 20. For example, land network 16 may include a public switched telephone network (PSTN) such as that used to provide hardwired telephony, packet-switched data communications, and the Internet infrastructure (i.e., a network of interconnected computing device nodes). One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, data center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer (e.g., a SIP Presence server) where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or data center 20, or both. A computer 18 can also be used for providing Internet connectivity such as DNS services or as a network address server that uses DHCP or other suitable protocol to assign an IP address to the vehicle 12.

Data center 20 is designed to provide the vehicle electronics 28 with a number of different system backend functions and, according to the exemplary embodiment shown here, generally includes one or more switches 80, servers 82, databases 84, live advisors 86, as well as an automated voice response system (VRS) 88, all of which are known in the art. These various data center components are preferably coupled to one another via a wired or wireless local area network 90. Switch 80, which can be a private branch exchange (PBX) switch, routes incoming signals so that voice transmissions are usually sent to either the live adviser 86 by regular phone, backend computer 87, or to the automated voice response system 88 using VoIP. Server 82 can incorporate a data controller 81 which essentially controls the operations of server 82. Server 82 may control data information as well as act as a transceiver to send and/or receive the data information (i.e., data transmissions) from one or more of the databases 84, telematics unit 30, and mobile computing device 57.

Controller 81 is capable of reading executable instructions stored in a non-transitory machine readable medium and may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components. The live advisor phone can also use VoIP as indicated by the broken line in FIG. 1. VoIP and other data communication through the switch 80 is implemented via a modem (i.e., a transceiver), connected between the land communications network 16 and local area network 90.

Data transmissions are passed via the modem to server 82 and/or database 84. Database 84 can store account information such as vehicle dynamics information and other pertinent subscriber information. Data transmissions may also be conducted by wireless systems, such as 802.11x, GPRS, and the like. Although the illustrated embodiment has been described as it would be used in conjunction with a manned data center 20 using live advisor 86, it will be appreciated that the data center can instead utilize VRS 88 as an automated advisor or, a combination of VRS 88 and the live advisor 86 can be used.

Method

Figure 2:
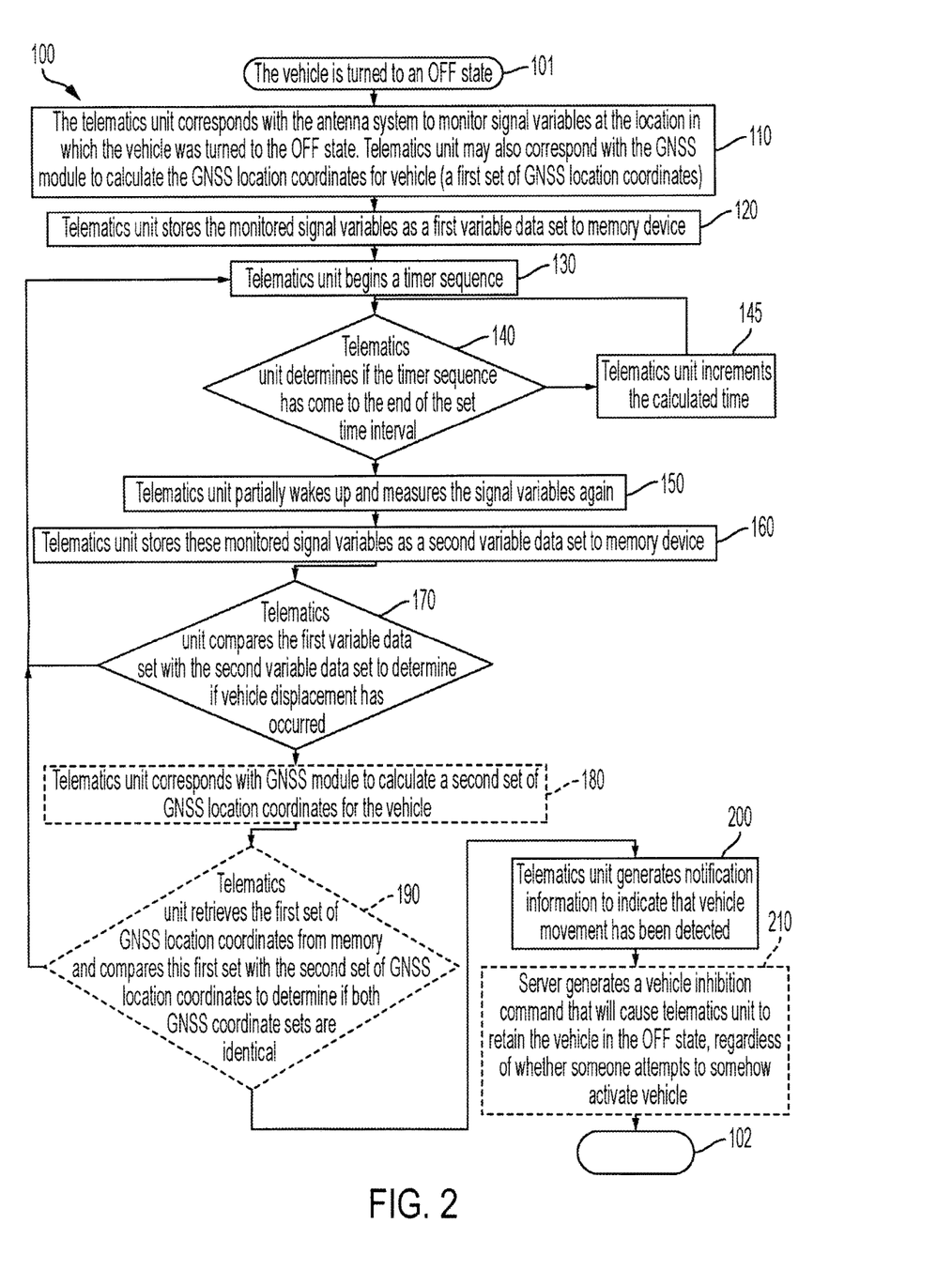
FIG. 2 is a flowchart of a process for detecting vehicle movement, in accordance with exemplary embodiments.

Now turning to FIG. 2, there is shown an embodiment of a method 200 to confirm the appearance of unwanted vehicle movement for the purposes of indicating the occurrence of vehicle tow and/or theft. One or more aspects of vehicle movement detection method 100 may be completed through vehicle telematics unit 30 which may include one or more executable instructions incorporated into memory device 54 and carried out by controller 52. One or more aspects of method 100 may otherwise, for example, be completed through data center 20 which may include one or more executable instructions incorporated into databases 84 and carried out by server 82. One or more ancillary aspects of method 100 may be completed by mobile computing device 57 and its user interface 59. Skilled artisans will moreover see that telematics unit 30, data center 20, and mobile computing device 57 may be remotely located from each other.

Method 100 is supported by telematics unit 30 being configured to establish one or more communication protocols with data center 20 as well as mobile computing device 57. This configuration may be established by a vehicle manufacturer at or around the time of the telematics unit's assembly or after-market (e.g., via vehicle download using the afore-described communication system 10 or at a time of vehicle service, just to name a couple of examples). In at least one implementation, one or more instructions are provided to the telematics unit 30 and stored on non-transitory computer-readable medium (e.g., memory device 54). Method 100 is supported by mobile computing device 57 being configured to establish one or more communication protocols with data center 20 as well as telematics unit 30. This configuration may be established by a mobile computing device manufacturer at or around the time of the device's assembly. Method 100 is further yet supported by preconfiguring mobile computing device 57 to exhibit information such as notifications on user interface 57 as well as store one or more corresponding software applications in its electronic memory.

Method 100 begins at 101 in which vehicle 12 is turned to an OFF state. When the vehicle is in the OFF state, the engine of the vehicle shuts down and, in one or more embodiments, the each VSM 42 enters into a routine keydown cycle, as follows, the VSMs 42 are considered awake but go through their power down sequences (which can last until the driver-side door is opened or for some time duration such as, for example, ten (10) minutes).

In step 110, during the key-down cycle, the telematics unit 30 corresponds with the antenna system 56 to monitor signal variables at the location in which the vehicle was turned to the OFF state. As such, the telematics unit 30 will monitor the cell identifier, cell frequency, RSRQ, and RSRP of the specific cell tower 70 in which the telematics unit 30 is wirelessly linked with (i.e., the serving cell) at the time of the vehicle being turned OFF. In this step, in one or more embodiments, the telematics unit may also monitor the signal variables (the cell identifier, cell frequency, RSRQ, and RSRP) of nearby cell towers 70 in the wireless carrier system 14 that antenna system 56 has yet to wirelessly link with but could link with if not for already being linked to the serving cell tower (i.e., the neighboring cells). Optionally, in step 110 (or at least some point after the vehicle arrives at the location in which it is turned OFF), telematics unit 30 corresponds with the GNSS module 40 to calculate the GNSS location coordinates for vehicle 12. Moreover, telematics unit 30 will store these GNSS location coordinates to memory device 54 (as a first set of GNSS location coordinates).

In step 120, telematics unit 30 will store these monitored signal variables as a first variable data set to memory device 54. This first variable data set may moreover be stored in a spreadsheet format and may be provided a data set indicator (for example the data set may be distinguished as "Set C").

Prior to fully powering down and prior to entering a discontinuous reception mode (DRX mode), in step 130, telematics unit 30 will begin a timer sequence. This timer will be set to count down to the end of a preconfigured time interval (for example, two (2) hours). Moreover, upon reaching the end of this time interval, while in DRX mode, telematics unit 30 will partially wake up and measure the signal variables over again. Skilled artisans will know DRX mode as a methodology implemented in wireless communications to conserve battery life of a mobile device. As such, for the purposes of one or more embodiments of method 100, DRX mode will allow telematics unit 30 to remain partially awake to run the timer sequence program and to wake up at the end of a time interval to briefly measure the signal variables over again (and, in certain instances, recalculate the GNSS coordinates of the vehicle) as well as conduct one or more comparison calculations.

In step 140, telematics unit 30 will determine if the timer sequence has come to the end of the set time interval. If it is determined that the end of the set time interval has been reached, method 100 will move to step 150; otherwise, method 100 will move to step 145. In step 145, since the set time interval has yet to be reached, telematics unit 30 will increment the calculated time and return to step 140. As should be understood, the loop between steps 140 and 145 should continue until the end of the set time interval has been reached.

In step 150, since the timer sequence has reached the end of its set time interval, as discussed above, telematics unit 30 will partially wake up and measure the signal variables once again. For example, similar to step 110, telematics unit 30 will again monitor the cell identifier, cell frequency, RSRQ, and RSRP of the serving cell tower 70 and may also monitor those signal variables of one or more neighboring cell towers. In step 160, telematics unit 30 will store these monitored signal variables as a second variable data set to memory device 54 and they may moreover be stored in a spreadsheet format and be provided a data set indicator (for example—Set C'). It should be understood that every time the telematics unit 30 monitors the signal variables in the DRX mode (i.e., after the first variable data set is measured), it may rewrite the second variable data set with the most recently monitored version of the signal variable information.

In step 170, telematics unit 30 will compare the first variable data set with the second variable data set (i.e., comparing C with C') to determine if vehicle displacement has occurred. Moreover, in this step, if telematics unit 30 determines the first and second variable data sets are identical or at least there are enough variables in common to be within a threshold amount (for example, five or fewer corresponding spreadsheet cells show differing information), method 100 returns to step 130 to begin a new timer sequence process since the vehicle does not appear to have moved. However, if telematics unit 30 determines the comparison of the first and second variable data sets show less variables in common than the threshold amount allows (for example, if there are more than six corresponding spreadsheet cells found to contain differing information), method 100 moves to optional step 180 since it is likely that distance has been created between one or more cell towers 70 and the vehicle 12 and thus vehicle 12 appears to have somehow moved.

In optional step 180, while still in DRX mode, telematics unit 30 will correspond with GNSS module 40 to calculate a second set of GNSS location coordinates for vehicle 12. In optional step 190, telematics unit 30 will retrieve the first set of GNSS location coordinates from memory and compare this first set with the second set of GNSS location coordinates to determine if both GNSS coordinate sets are identical. Moreover, if it is determined that the first and second set of GNSS location coordinates are the same (or at least within a threshold range of variation), method 100 will return to step 130 because it does not appear that the vehicle has been displaced. However, if it is determined that the first and second set of GNSS location coordinates are substantially different (e.g., the GNSS coordinate differential shows the vehicle has moved more than five (5) yards), method 100 will move to step 200. As follows, skilled artisans will see that making a comparison of the GNSS location coordinate sets can be a safeguard to ensure miscalculations made when comparing the signal variation data sets (step 170) does not cause method 100 to improperly advance. It should be further understood that one or more embodiments of method 100 will not incorporate steps 180 and 190 and thus, in such embodiments, method 100 will advance directly from step 170 to step 200.

In step 200, telematics unit 30 will generate notification information to indicate that vehicle movement has been detected. This notification may be embodied as a Short Messaging Service (SMS)-based Over-The-Air (OTA) notification or may be embodied as some other data transmission format depending on the requirements of the recipient device(s) (e.g., mobile computing device 57 and/or data center 20). Moreover, the notification information may include text for the purpose of indicating vehicle movement as well as the occurrence of vehicle theft. For example, the text may state something to the effect of "ALERT: VEHICLE MOVEMENT DETECTED WHILE THE ENGINE AND IGNITION HAVE REMAINED OFF, THIS MAY INDICATE THAT EITHER VEHICLE TOW AWAY OR THEFT HAS OCCURRED/IS OCCURRING."

In this step, in one or more embodiments, telematics unit 30 will transmit the notification directly to the mobile computing device 57 known to be owned by the same person that owns vehicle 12. In these embodiments, the notification will be an SMS-based OTA notification formatted to be viewed on user interface 59. Thus, the notification will be configured to allow the vehicle owner to see that vehicle theft has occurred and infer that the vehicle 12 may have been towed away while it was in the OFF state.

Moreover, in this step, in one or more embodiments, telematics unit will send the notification to data center 20 (i.e., server 82) in a known and suitable format. When the notification has been received by server 82, the server 82 will analyze the notification, reword the text language of the notification (if needed), reformat notification to an SMS-based OTA notification arrangement that can be viewed on user interface 59 (if needed), look up the mobile computing device 57 known to be owned by the same person that owns vehicle 12 in database 84, select the mobile computing device 57 as a recipient of the notification, and send the notification to that recipient mobile computing device 57. Thus, in these embodiments, the notification will allow the vehicle owner to see that vehicle movement has occurred and thus vehicle theft or tow away may have happened.

In optional step 210, server 82 will generate a vehicle inhibition command that will cause telematics unit 30 to retain the vehicle 12 in the OFF state regardless of whether someone attempts to somehow activate vehicle 12. In this step, moreover, server 82 will send this command to telematics unit 30 and vehicle 12 should remain in the OFF state until an override command is sent by server 82. Backend generated vehicle inhibition commands of this nature are well known. After optional step 210 (or step 200 when method skips optional step 210), method 100 will move to completion 102.

It should be understood that method 100 can be interrupted and thus automatically terminated when the vehicle is turned to an ON state. In essence, when the vehicle returns to an operational state (the engine and VSMs are returned to full power), the purpose of the vehicle movement detection method 100 becomes unnecessary at least until the vehicle returns to an OFF state. However, in one or more embodiments, when method 100 is interrupted because the vehicle is turned to an ON state, the GNSS module 42 may be activated to detect vehicle movement while the vehicle was in the OFF state (similar to the manner discussed with regard to optional steps 180 and 190). In these one or more embodiments, when movement is detected, telematics unit 30 will send a notification to data center 20 (i.e., server 82) so that data center 20 may generate an SMS-based OTA notification to mobile computing device 57 (in a manner similar to that discussed in step 200). It should also be reiterated that, in one or more alternative embodiments, one or more steps of method 100 can be carried out by server 82 of data center 20.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method of detecting vehicle movement, the method comprising:
    (a) measuring, via a controller, one or more signal variables as a first variable data set;
    (b) at some duration of time after the first variable data set is measured, via the controller, measuring the one or more signal variables as a second variable data set;
    (c) comparing, via the controller, the first and second variable data sets;
    (d) determining, via the controller, if substantial differences exist between the first and second variable data sets; and
    (e) when it is determined that substantial differences exist between the first and second variable data sets, via the controller, generating a notification configured to indicate the vehicle movement has been detected; wherein:
    prior to step (b), (f) measuring, via the controller, global navigation satellite system (GNSS) location data from a GNSS module as first GNSS location coordinates;
    (g) after it is determined that substantial differences exist between the first and second variable data sets, via the controller, measuring the GNSS location data from the GNSS module as second GNSS location coordinates;
    (h) comparing, via the controller, the first and second GNSS location coordinates;
    (i) determining, via the controller, if substantial differences exist between the first and second GNSS location coordinates; and
    wherein step (e) is further defined as generating, via the controller, a notification configured to indicate vehicle movement has been detected when it is determined that both (1) substantial differences exist between the first and second variable data sets and (2) substantial differences exist between the first and second GNSS location coordinates.

2. The method of claim 1, further comprising (i) sending, via the controller, the notification to a mobile computing device.

3. The method of claim 2, wherein the notification is sent to the mobile computing device for the purpose of indicating an occurrence of vehicle theft or tow away.

4. The method of claim 1, further comprising:
    (j) sending, via the controller, the notification to a data center;
    (k) formatting, via the data center, the notification to be exhibitable on a user interface of a mobile computing device for the purpose of indicating an occurrence of vehicle tow away or theft; and
    (l) sending, via the data center, the notification to the mobile computing device.

5. The method of claim 4, wherein the controller is located in a telematics unit of a vehicle and each step of the method occurs after the vehicle has been turned to an OFF state.

6. The method of claim 5, further comprising:
    (m) generating, via the data center, a vehicle inhibition command to cause the vehicle to remain in the OFF state when the notification has been received; and
    (n) sending, via the data center, the vehicle inhibition command to the vehicle.

7. The method of claim 1, wherein the signal variables comprising a received signal received quality (RSRQ), received signal received power (RSRP), cell identifier, and cell frequency identified from a serving cell tower as well as an RSRQ, RSRP, cell identifier, and cell frequency identified from one or more neighboring cell towers.

8. The method of claim 1, wherein the one or more signal variables are received from a plurality of cell towers of a wireless carrier system.

9. A system of detecting vehicle movement, the system comprising:
    a memory configured to comprise one or more executable instructions and a controller configured to execute the executable instructions, wherein the executable instructions enable the controller to:
    (a) measure one or more signal variables as a first variable data set;
    (b) at some duration of time after the first variable data set is measured, measure the one or more signal variables as a second variable data set;
    (c) compare the first and second variable data sets;
    (d) determine if substantial differences exist between the first and second variable data sets; and
    (e) when it is determined that substantial differences exist between the first and second variable data sets, generate a notification configured to indicate the vehicle movement has been detected; wherein the executable instructions further enable the controller to:
    prior to step (b), (f) measure global navigation satellite system (GNSS) location data from a GNSS module as first GNSS location coordinates;
    (g) after it is determined that substantial differences exist between the first and second variable data sets, measure the GNSS location data from the GNSS module as second GNSS location coordinates;
    (h) compare the first and second GNSS location coordinates;
    (i) determine if substantial differences exist between the first and second GNSS location coordinates; and
    wherein step (e) is further defined as generate a notification configured to indicate vehicle movement has been detected when it is determined that both (1) substantial differences exist between the first and second variable data sets and (2) substantial differences exist between the first and second GNSS location coordinates.

10. The system of claim 9, wherein the executable instructions further enable the controller to: (i) send the notification to a mobile computing device.

11. The system of claim 10, wherein the notification is sent to the mobile computing device for the purpose of indicating an occurrence of vehicle theft or tow away.

12. The system of claim 9, further comprising:
    a data center located remotely from the controller;
    wherein the executable instructions further enable the controller to:
    (j) send the notification to the data center; and wherein, after being received, the data center formats the notification to be exhibitable on a user interface of a mobile computing device for the purpose of indicating an occurrence of vehicle theft and the data center subsequently sends the notification to the mobile computing device.

13. The system of claim 12, wherein the controller is located in a telematics unit of a vehicle and the controller executes the executable instructions after the vehicle has been turned to an OFF state.

14. The system of claim 13, wherein:
the data center will generate a vehicle inhibition command to cause the vehicle to remain in the OFF state when the notification has been received; and
the data center will send the vehicle inhibition command to the vehicle.

15. The system of claim 9, wherein the signal variables comprising a received signal received quality (RSRQ), received signal received power (RSRP), cell identifier, and cell frequency identified from a serving cell tower as well as an RSRQ, RSRP, cell identifier, and cell frequency identified from one or more neighboring cell towers.

16. The system of claim 9, wherein the one or more signal variables are received from a plurality of cell towers of a wireless carrier system.

17. A non-transitory and machine-readable medium having stored thereon executable instructions adapted to detect vehicle movement, which when provided to a controller and executed thereby, causes the controller to:
(a) measure one or more signal variables as a first variable data set;
(b) at some duration of time after the first variable data set is measured, measure the one or more signal variables as a second variable data set;
(c) compare the first and second variable data sets;
(d) determine if substantial differences exist between the first and second variable data sets; and
(e) when it is determined that substantial differences exist between the first and second variable data sets, generate a notification configured to indicate vehicle movement has been detected; wherein the executable instructions further enable the controller to:
prior to step (b), (f) measure global navigation satellite system (GNSS) location data from a GNSS module as first GNSS location coordinates;
(g) after it is determined that substantial differences exist between the first and second variable data sets, measure the GNSS location data from the GNSS module as second GNSS location coordinates;
(h) compare the first and second GNSS location coordinates;
(i) determine if substantial differences exist between the first and second GNSS location coordinates; and
wherein step (e) is further defined as generate a notification configured to indicate vehicle movement has been detected when it is determined that both (1) substantial differences exist between the first and second variable data sets and (2) substantial differences exist between the first and second GNSS location coordinates.

18. The non-transitory and machine-readable memory of claim 17, further comprising: (j) send the notification to a mobile computing device.

* * * * *